United States Patent Office 3,749,566
Patented July 31, 1973

3,749,566
IMPROVING RESISTANCE OF RICE SEED TO PREEMERGENCE HERBICIDES
Otto L. Hoffmann, Shawnee, Kans., assignor to Gulf Research & Development Company, Pittsburgh, Pa.
No Drawing. Continuation-in-part of application Ser. No. 770,856, Oct. 25, 1968, now Patent No. 3,564,768. This application Feb. 8, 1971, Ser. No. 113,763
Int. Cl. A01n 9/12
U.S. Cl. 71—100                3 Claims

ABSTRACT OF THE DISCLOSURE

In combating undesired vegetation in growing low land rice, rice seed is soaked for a period of about one day in an aqueous solution containing about one percent of sodium hypochlorite bleaching solution and from about ⅛ percent to about one percent preferably about ¼ percent of the water soluble dimethylamine or diethanolamine salt made by reacting the amine with 1,8-naphthalic anhydride or 1,8-naphthalic acid prior to planting. The rice seed so treated is rendered resistant to preemergence herbicides such as molinate, which may then be used to combat particularly noxious weeds such as red rice.

DESCRIPTION OF THE INVENTION

This application is a continuation-in-part of U.S. patent application Ser. No. 770,856 filed Oct. 25, 1968, now U.S. Pat. No. 3,564,768. In the prior application it was disclosed that corn (*Zea mays*) is protected from injury by N,N-dialkylthiocarbamate ester preemergent herbicides by coating the corn seed prior to planting with a nonphytotoxic quantity of 1,8-naphthalic anhydride. This seed-treating agent is cheap and easily forms a dry coating on corn seed, either by agitation with finely divided solid 1,8-naphthalic anhydride or by thorough mixing of a small amount of a solution of the compound in a solvent such as methanol, followed by drying. Application of the chemical to other crop seeds, however, is not necessarily successful, either because of surface characteristics of the seed, or the manner in which the seed is normally treated or handled prior to planting.

In the highly mechanized culture of lowland rice in some areas it is a customary practice to soak the rice seed for 24 hours in water to which has been added one percent of a commercial sodium hypochlorite bleaching solution (believed to alleviate the dormant condition of some seeds), to drain the seed for 24 hours and then plant the seed by sowing from a helicopter or other agricultural aircraft on preirrigated land. Unfortunately the only feasible means of obtaining substantially complete control of some of the most pestiferous weeds in the rice fields is to employ a preemergence herbicide. This technique is unworkable in the method of planting described above because of preemergence herbicide must be put down prior to the sprouting of the rice seed and would kill both the rice and the weeds.

I have discovered that addition of an effective amount of an amine salt of an N-substituted-1,8-naphthalamic or 1,8-naphthalic acid to the aqueous solution in which the rice seed is soaked will greatly increase the resistance of the rice seed to preemergence herbicides such as molinate, making it possible to employ this type of herbicide and obtain good control of a variety of weeds, including the weed red rice which is botanically the same species as cultivated rice and has the same susceptibility to herbicides.

The seed treating amine salts are easily prepared, for example, by the procedures described below. The water soluble products obtained by addition of amines to naphthalic anhydride appear to be amine salts of corresponding naphthalamic acids, whereas bis amine salts are obtained from the free acid itself.

Preparation of seed-treating agents (A) Preparation of a dimethylamine salt.—A mixture containing 19.8 g. (0.1 M) 1,8-naphthalic anhydride and 36.0 g. (0.2 M) dimethylamine (25% in water) was stirred until solution was complete. The final solution was brought to a volume of 79.2 ml. with water to give 0.25 g. 1,8-naphthalic anhydride equivalent per milliliter.

(B) Preparation of a diethanolamine salt.—A mixture containing 21.0 g. (0.2 M) diethanolamine and 19.8 g. (0.1 M) 1,8-naphthalic anhydride was stirred until solution was complete. A slight turbidity was removed by filtration (0.65 g.). The solution was brought up to 77 ml. to give approximately 0.25 g., 1,8-naphthalic anhydride equivalent.

The method of improving the resistance of rice seed to preemergent herbicides is exemplified specifically below:

EXAMPLE 1

To five grams rice in a 3 dram vial was added 6 ml. water and enough of the above solution to give the desired rate of 1,8-naphthalic anhydride equivalent of 0, ⅛, ¼, ½, 1 and 2% on the basis of seed weight. In one series 1% of a commercial dilute sodium hypochlorite bleach solution (about 5 percent sodium hypochlorite) was used. In the other series no hypochlorite was added to the soak water.

The seed was soaked for 24 hours and was then drained for 24 hours. Fifteen seeds were planted in each row in greenhouse flats. Half of each lot of flats was treated with molinate (Ordram) at a 3 lb./a. rate and half of each lot was left untreated. Three replicates of each treatment were planted. Counts of plant stands were made two weeks after planting. The number of plants emerging from 45 seeds (combined sum from three replicates) is as follows:

| 1,8-naphthalic anhydride equivalent rate pre-treatments | | Number of plants emerging at— | | | | | | |
|---|---|---|---|---|---|---|---|---|
| Seed | Soil | 0% | ⅛% | ¼% | ½% | 1% | 2% | Σ |
| Sodium hypochlorite | Molinate | 0 | 20 | 30 | 24 | 24 | 11 | 109 |
| Do | None | 23 | 29 | 35 | 23 | 27 | 18 | 155 |
| Do | Molinate | 1 | 21 | 24 | 24 | 25 | 18 | 113 |
| Do | None | 21 | 33 | 23 | 28 | 31 | 15 | 151 |
| | Σ | 45 | 103 | 112 | 99 | 107 | 62 | | without the protection from the reaction product of 1,8-naphthalic anhydride and dimethylamine only one plant came up from 90 seeds where molinate was used for weed control. Substantial protection from molinate injury at all the rates tested here was obtained.

Example 2

To five grams rice in a 3 dram vial was added 6 ml. water and enough of the diethanolamine salt solution to give the desired rate of 1,8-naphthalic anhydride equivalent of 0, ⅛, ¼, ½, 1 and 2% on the basis of seed weight. Sodium hypochlorite bleach solution (Clorox) was used at a rate of 1%.

The seeds were soaked for 24 hours and then drained for 24 hours. Fifteen seeds were planted in each row in greenhouse flats. Half of each lot of flats was treated with molinate (Ordram) at a 3 lb./a. rate and half of each lot was left untreated. Three replicates of each treatment were planted. Counts of plant stands were made two weeks after planting. The number of plants emerging from 45 seeds (combined sum from three replicates) is as follows:

| 1,8-naphthalic anhydride equivalent rate pre-treatments | | Number of plants emerging at— | | | | | | |
|---|---|---|---|---|---|---|---|---|
| Seed | Soil | 0% | ⅛% | ¼% | ½% | 1% | 2% | Σ |
| Sodium hypochlorite | Molinate | 3 | 20 | 28 | 27 | 19 | 16 | 113 |
| Do | None | 27 | 27 | 24 | 19 | 10 | 13 | 120 |

Example 3

The diethanolamine salt solution of Example 2 was used at a rate of ¼% 1,8-naphthalic anhydride equivalent on five varieties of rice. The plant treatment and culture was as given in Example 2. After two weeks the plant stands were as follows:

| | Number of plants emerging at— | | | |
|---|---|---|---|---|
| | No herbicide | | 3 lbs./a. molinate | |
| Variety | No pre-treatment | ¼% 1,8-naphthalic anhydride equivalent | No pre-treatment | ¼% 1,8-naphthalic anhydride equivalent |
| Star Bonnet | 32 | 26 | 3 | 32 |
| Nato | 40 | 35 | 1 | 24 |
| Saturn | 35 | 38 | 3 | 31 |
| Belle Patricia | 37 | 27 | 1 | 17 |
| Blue Belle | 32 | 33 | 2 | 26 |

Example 4

Substantially the same results as reported in Example 1 and 2 were obtained with the bis (dimethylamine) salt of 1,8-naphthalic acid, prepared by addition of two stoichiometric equivalents of amine to 1,8-naphthalic acid, instead of the corresponding anhydride.

I claim:

1. The method of rendering rice seed resistant to N,N-dialkylthiocarbamate ester preemergence herbicides comprising the step of soaking rice seed in an aqueous solution of an amine salt obtained by addition of an amine and water to 1,8-naphthalic anhydride or 1,8-naphthalic acid.

2. The method of claim 1 in which the amine salt was obtained by addition of dimethylamine and water to 1,8-naphthalic anhydride or 1,8-naphthalic acid.

3. The method of claim 1 in which the amine salt was obtained by addition of diethanolamine and water to 1,8-naphthalic anhydride or 1,8-naphthalic acid.

References Cited

UNITED STATES PATENTS

| 3,117,909 | 5/1964 | Dounos, Jr., et al. | 424—27 |
| 3,131,509 | 5/1964 | Hoffmann | 71—115 X |
| 3,564,768 | 2/1971 | Hoffmann | 71—100 X |

JAMES O. THOMAS, Jr., Primary Examiner

U.S. Cl. X.R.

47—576; 117—3